A. MAY.
INDICATOR FOR RAILWAY CARS.
APPLICATION FILED AUG. 24, 1911.
1,025,003.
Patented Apr. 30, 1912.
3 SHEETS—SHEET 2.
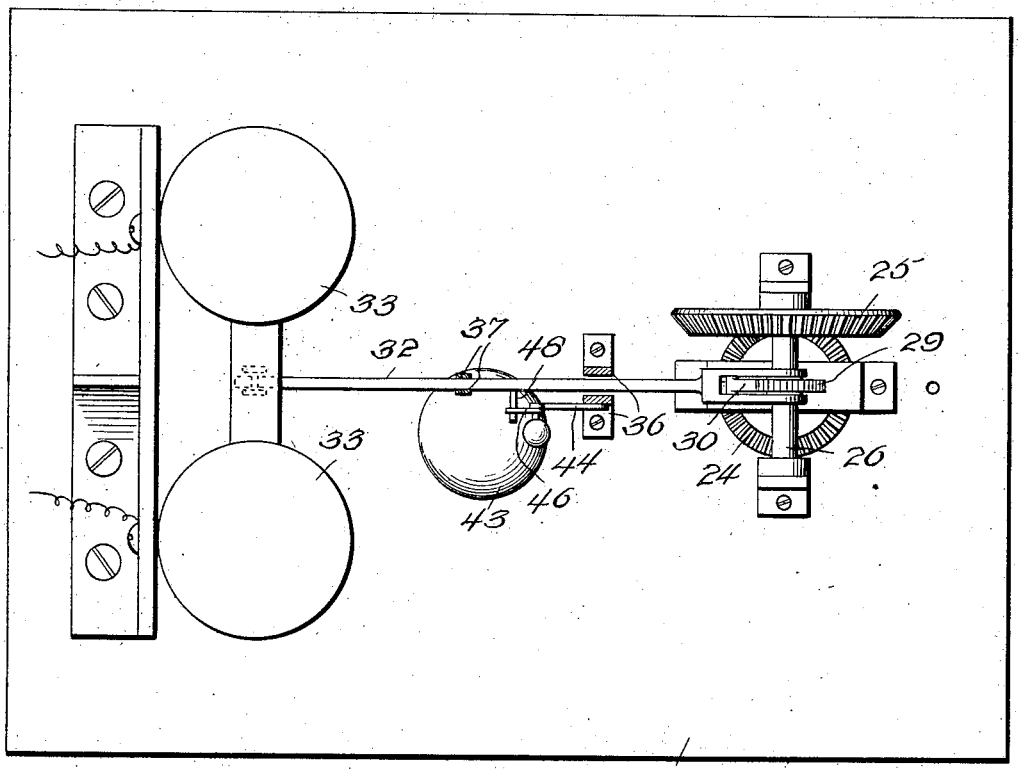
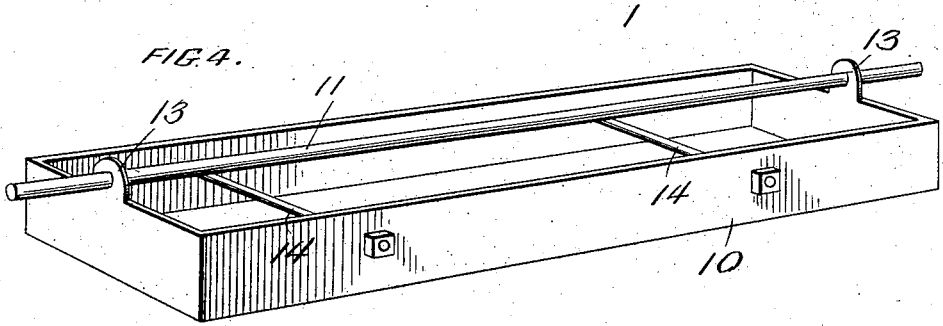
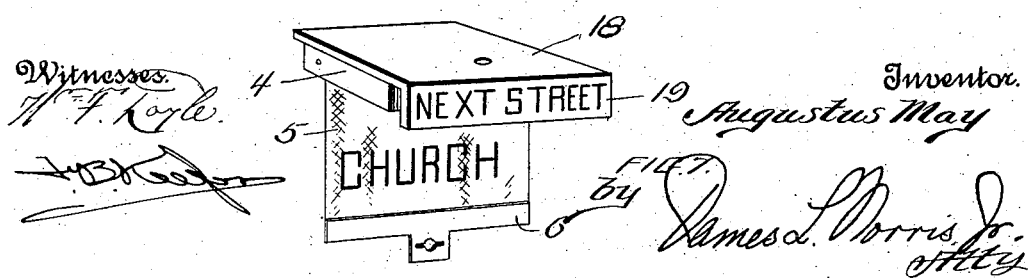

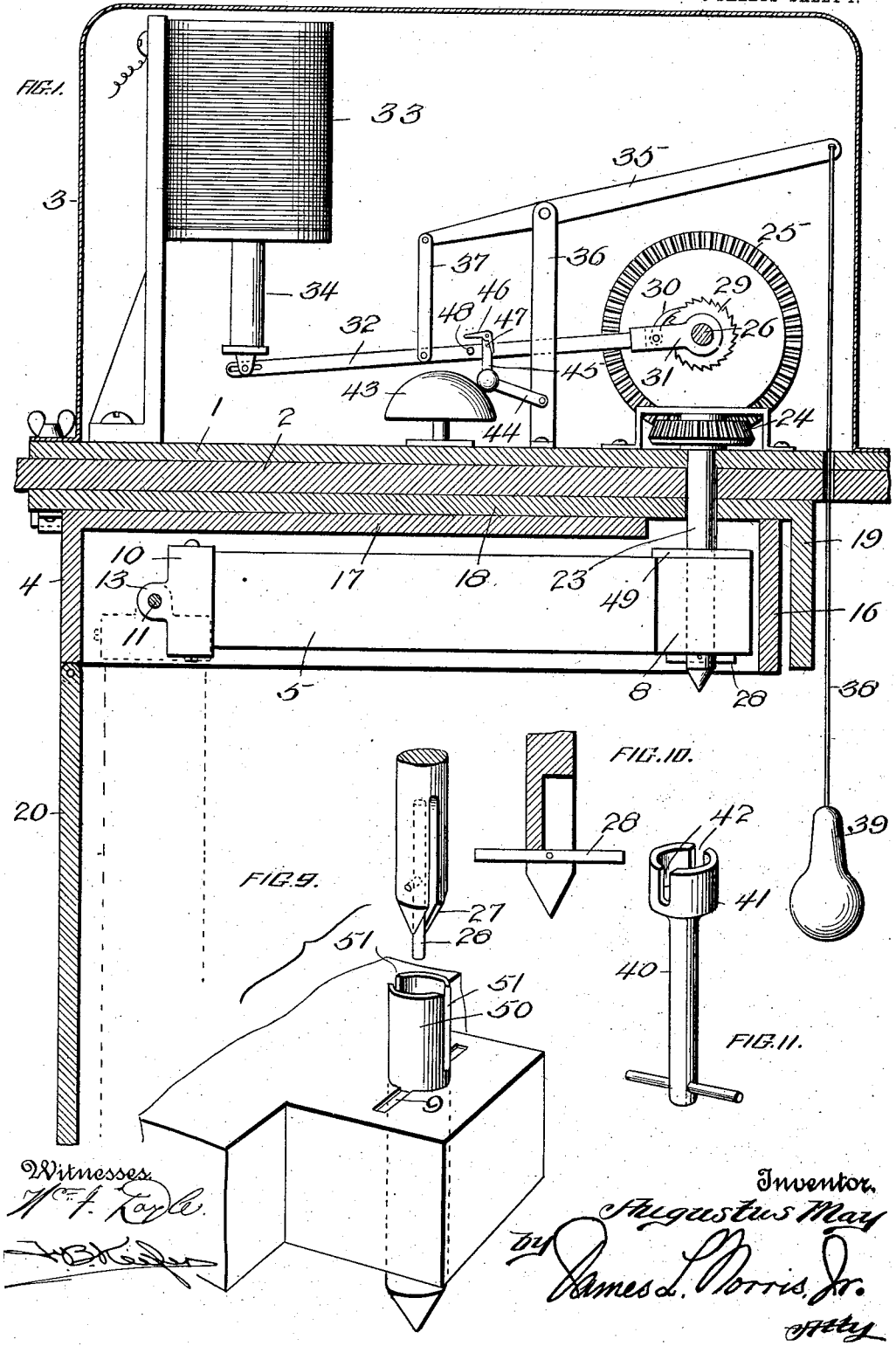

A. MAY.
INDICATOR FOR RAILWAY CARS.
APPLICATION FILED AUG. 24, 1911.
1,025,003.
Patented Apr. 30, 1912.
3 SHEETS—SHEET 3.
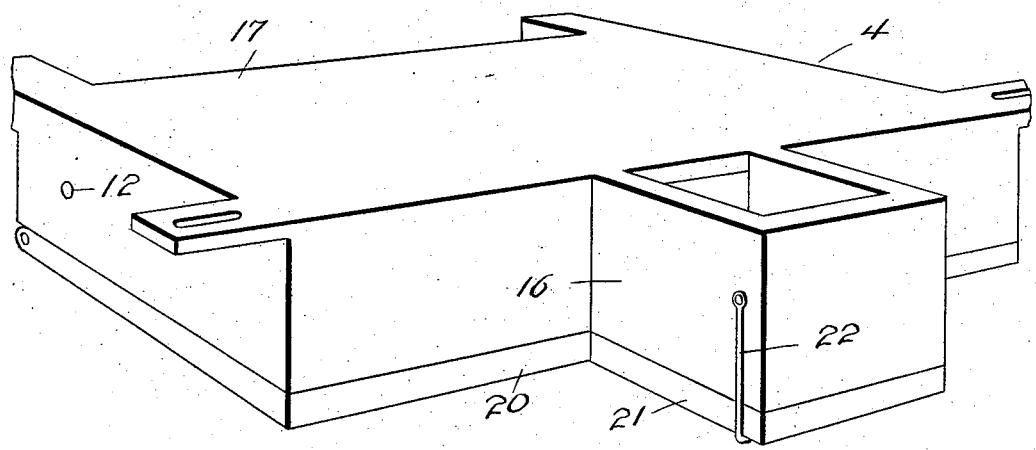
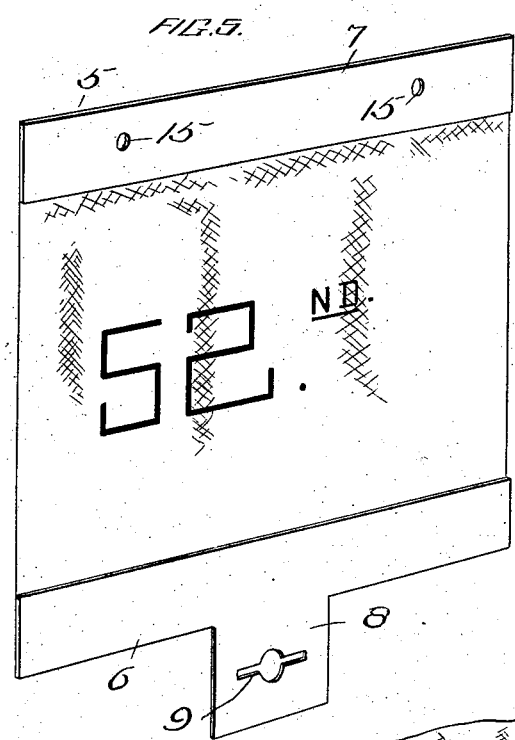
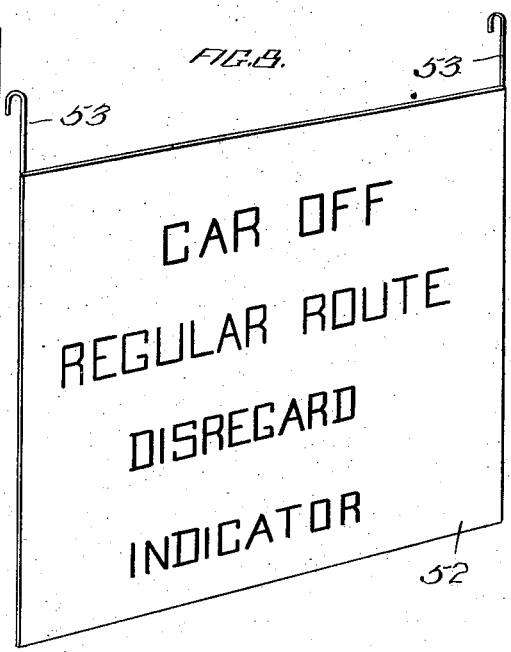
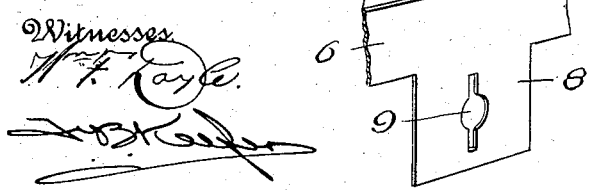

UNITED STATES PATENT OFFICE.

AUGUSTUS MAY, OF NEW ORLEANS, LOUISIANA.

INDICATOR FOR RAILWAY-CARS.

1,025,003.  Specification of Letters Patent. Patented Apr. 30, 1912.

Application filed August 24, 1911. Serial No. 645,786.

*To all whom it may concern:*

Be it known that I, AUGUSTUS MAY, a citizen of the United States, residing at New Orleans, in the parish of Orleans and State of Louisiana, have invented new and useful Improvements in Indicators for Railway-Cars, of which the following is a specification.

The present invention has reference to indicators for railway cars, and more especially to that type of indicator in which the names of the streets or stations are successively displayed during the travel of the car along its route.

It comprehends certain improvements, hereinafter referred to at length, which relate primarily to the construction of the case wherein the indicating elements are disposed, the arrangement of these elements in the case, and the actuating mechanism by means whereby they are successively released and allowed to drop into visible or operative position.

A structural embodiment of the invention is illustrated in the accompanying drawings, wherein—

Figure 1 is a vertical sectional view of the improved indicator apparatus complete; Fig. 2 is a plan view, with the hood removed and the secondary operating lever omitted; Fig. 3 is a perspective view of the case wherein the indicator elements are initially supported; Fig. 4 is a perspective view of the carriage to which said elements are connected; Fig. 5 is a perspective view of one of said elements; Fig. 6 is a fragmental perspective view of the supporting and releasing portion of the alternative form of indicator element; Fig. 7 is a perspective view, on a reduced scale, showing the operative position of one of the indicator elements with relation to the case; Fig. 8 is a perspective view of an auxiliary indicator element employed under certain circumstances; Fig. 9 is a fragmental perspective view showing the manner in which the indicator elements may be re-connected to the supporting and releasing mechanism, and the loading device employed during such operation; Fig. 10 is a fragmental sectional view of the main shaft or spindle of the releasing mechanism; and Fig. 11 is a perspective view of a hand-operated key adapted to be employed in connection with the releasing mechanism.

As shown in said drawings, and more especially in Fig. 1, the apparatus comprises, primarily, a base 1, which supports the operating or working parts hereinafter enumerated, and is, in turn, removably mounted upon the car roof 2 in any suitable manner, and a hood 3 inclosing the above-mentioned working parts and likewise removably connected to said base. To the under face of the car roof, (*i. e.*, within the car), and preferably at the end thereof, there is detachably secured the case 4 which, as above stated, initially supports and contains the indicator elements 5. In the construction illustrated, which is at present considered the preferred form, the indicator elements consist each of a flexible curtain or curtain-like member made of suitable textile fabric and having its end edges strengthened by metal strips 6 and 7. The front strip 6 of each curtain is provided with a lateral tongue 8, in which there is formed a double key-hole slot 9, this tongue constituting the supporting and releasing portion of the curtain. The slot in the tongue of each curtain may be and preferably is disposed at right angles to those in the tongues of the curtains which directly precede and succeed that particular curtain, so that when all of the curtains are arranged in place, as described hereinafter, there will be, in effect, two series of slots which intersect each other centrally and which are arranged at right angles to each other.

To support the curtains, which are marked with the names of the successive streets or stations, together with any other additional matter desired, there is preferably provided a carriage 10, which is shown in detail in Fig. 4. This carriage is in the form of an elongated rectangular frame which is open at top and bottom and is pivotally mounted within case 4 upon a horizontal rod 11 that is supported at its ends in perforations 12 in the side walls of said case, the end walls of the frame being provided with perforated ears or lugs 13 through which said rod passes. Since these perforated lugs 13 are located upon the rear or upper edges of the aforesaid end walls of the carriage, as depicted in Figs. 1 and 4, it will be apparent that the latter has, in effect, an eccentric pivotal mounting, whereby its downward turning or swinging movement under the weight of the released curtains, as described hereinafter, is materially facilitated. The frame in question carries two transverse bolts 14 removably supported in its main or side walls, these bolts passing through perforations 15 formed in the rear strips 7 of the curtains, so that the latter are connected to the frame in much the same manner as the sheets or leaves in a loose-leaf binder.

As regards case 4, it may be stated that said case has substantially the same shape as the curtains which it incloses; that is to say, it is rectangular and its front wall is formed with a lateral neck-like extension 16 which receives the tongue portions 8 of the curtains and is open at top and bottom. The upper part of the case proper is covered or closed by a roof or top wall 17 which is overlaid by and secured to a plate 18 that is directly attached to the car roof and is formed at its front edge with a depending flange or shoulder 19 bearing upon its outer face the words "Next street," or some similar legend. Said flange extends in front of the front wall of the neck 16, as depicted in Fig. 7. The bottom wall 20 of the case is hinged to the rear end wall of the latter and is adapted to swing downwardly into vertical position when the apparatus is in use; this wall is provided at its front end with a reduced neck 21 that underlies neck 16 and is engaged by a bail or similar fastening device 22 when it is desired to close the case bottom.

The several curtains are initially supported and successively released at the proper times by means of mechanism which may be actuated either automatically or manually. Such mechanism preferably includes a vertically disposed spindle provided with a curtain-supporting pin and devices for effecting the rotation of the spindle. In the present construction, the spindle, which is designated by the numeral 23 is suitably journaled at its upper end under hood 3, and is provided at that point with a bevel gear 24 which meshes with a larger bevel gear 25 mounted upon a horizontal shaft 26 likewise supported and journaled within said hood. The body of said spindle projects through registering perforations in the parts 1, 2 and 18 into and through the neck portion of case 4, its lower end being pointed and longitudinally slotted, as indicated by the numeral 27; this slot is continued upward at one side of the spindle so as to produce a seat or recess for one arm of the supporting pin 28, which pin is centrally pivoted in said slot. The spindle body also extends through the central portions of the intersecting slots 9 in the curtain tongues, as will be understood, the lowermost curtain resting directly upon the above-mentioned pin, with its tongue slot 9 at right angles to the latter. As has already been stated, the slots in successive curtains are preferably arranged at right angles to one another; this being the case, it will be apparent that if the spindle be given a series of quarter turns, each actuation thereof will bring the pin 28 into alinement with a slot 9, whereupon the then lowermost curtain will be free to drop into vertical position, so as to reveal the name of the street with which it is marked. To provide for the movement of the spindle required to insure this operation, there is fixed upon the shaft 26 a ratchet 29 engaged by a pawl 30 which is here shown as carried by a sleeve 31 loosely mounted upon said shaft, said sleeve being securely attached to the adjacent end of the primary operating lever 32 disposed within hood 3. The parts just referred to are so constructed and proportioned that upon each upward swinging movement of the lever, (effected as hereinafter described), shaft 26 will be rotated in a clockwise direction to an extent sufficient to turn to rotate the spindle through an arc of 90°. It is to be understood, however, that the slots in successive curtains may be arranged at angles which are greater or less than that specified, in which case the extent of the turns given the spindle will be correspondingly changed by varying the proportions of the operating parts, as will be obvious.

The main lever 32 may be rocked either automatically or manually, as has also been stated. In the former case, there is provided a solenoid 33 with whose core 34 the other end of said lever is connected. The circuit in which the solenoid is included may be closed in any suitable manner at the proper times, as, for example, by the passage of one of the car wheels over contact pieces carried by or connected with the track rails; this, however, is not in itself a part of the present invention, and, in consequence, requires neither specific illustration nor description, as any of the well-known circuit-closing devices used in analogous connections may be employed.

To operate the main lever manually, there is preferably provided a secondary or auxiliary lever 35 fulcrumed upon a bracket 36 mounted within the hood upon the base plate 1 and connected at its inner end to the said main lever by a link 37, or the like, the outer end having suspended therefrom a pull cord 38 which passes through perforations in the base plate and car roof into the interior of the car, and terminates in a handle 39 disposed within easy reach of the conductor.

When from any cause both or either of the operating devices above described fail to work properly, or become inoperative, an additional implement 40 may be utilized for turning the spindle. This implement, as depicted in Fig. 11, is preferably in the form of a key having an enlarged upper end 41 which is adapted to fit over the pointed spindle end and is provided with a pair of opposed slots 42 for the reception of the arms of the supporting pin 28. When so disposed, the key may be readily turned, thus rotating the spindle and bringing the pin 28 into alinement with the slot 9 in the lowermost curtain, to permit that curtain to drop, the operation being repeated as often as is necessary.

If desired, an audible signal may be provided for giving notice of each actuation of the device. This signal and its actuating means are depicted in Fig. 1, and, as there shown, comprise a bell or gong 43 operated by a hammer 44 which is pivoted to the bracket 36. The head or weighted portion of the hammer is provided, in the present instance, with an upwardly-extending arm 45, having a bell-crank trigger 46 pivoted thereto. One arm of said trigger normally engages a pin 47 set into arm 45, while the other arm is adapted to be engaged by a second pin 48 carried by lever 32, the arrangement being such that during each upward movement of said lever its pin 48 will engage the second-named arm of the trigger and will raise the latter and the hammer; as this movement continues, pin 48 will finally disengage the trigger, and the hammer will descend of its own weight, its head striking the gong. During the subsequent return movement of the lever, pin 48 will rock the trigger idly upon its pivot and pass beneath into its initial position. Means other than those above described may, however, be provided for indicating the actuation of the apparatus, as will be apparent.

It will be understood from the foregoing that at each actuation of the apparatus, whether automatic or manual, a curtain will be released and will drop so as to render its marking visible to the occupants of the car. The carriage 10 to which the curtains are connected is pivotally mounted upon its supporting rod 11, and as the curtains successively drop the carriage will gradually turn upon its pivot as the combined weight of the released curtains increases, until it finally assumes the vertical position indicated in dotted lines in Fig. 1. This enables the curtains, as they are successively released, to assume as nearly as possible a vertical position, flat against one another. To effect the instant release of a curtain as soon as pin 28 is brought into alinement with its slot 9, a weight 49 may be slidably mounted upon the spindle 23 above the curtains, so as to exert its pressure thereupon.

After all of the curtains have been released at the end of a trip, they are reëngaged with the spindle, and in carrying out this operation a loading device is provided. Such device, as depicted in Fig. 9, preferably comprises a hollow cylinder 50 which is pointed at its lower end and provided at its upper end with a pair of opposed slots 51, the outer diameter of the cylinder being approximately equal to that of the enlarged central portions of the slots 9 and its inner diameter approximately equal to that of the spindle. The curtains are engaged with the loader by passing the latter through the aforesaid central portions of slots 9, its pointed end facilitating this operation, until said end projects through the slot in the rearmost curtain, (see Fig. 9). The loader is then grasped by its projecting end, and is raised, together with the curtains, until the pointed lower end of the spindle is received within the loader. Previous to this step, however, the pin 28 carried by the spindle is moved into its vertical position, as shown in Fig. 9, care being taken to so dispose the loader, in passing the same through the slots 9, that the slots 51 in its upper end will exactly aline with the spindle slot 27. After the spindle end has been introduced into the loader, as above described, the curtains are slid from said loader onto said spindle, and the supporting pin 28 then turned into horizontal position, its arms passing through the loader slots during such movement. The curtains will thus be held in raised or operative position, and the loader may then be disengaged from the spindle. The slots 51 in the loading cylinder 50 are provided in order to enable the pin 26 to be moved into horizontal position before said cylinder is removed from spindle 23; it would be necessary, otherwise, for the operator after having transferred the curtains to the spindle from the loader to support the curtains above the spindle slot 27, then withdraw the loader, and finally move pin 26 into horizontal position, so that by the formation of the loader slots the entire transferring operation is materially facilitated.

As further regards the curtains, it may be stated that a sufficient number are provided to cover a single complete trip of the car. Where the outward and homeward trips of the car are continuous and the car travels along an approximately elliptical or circular route, the same indicator may be used for both trips, and enough curtains for both trips will be utilized, but where each out trip and each return trip is complete in itself, and the car faces or heads in one direction during one trip and in the opposite direction during the other trip, a separate indicator for each end of the car will be preferably employed. The curtains, as will be understood, are marked and arranged for a particular route, and if for any reason the car in which they are used happens to be traveling on a route other than its ordinary one, it will be obviously necessary to disregard the indicator; in such instance, the auxiliary warning curtain 52, shown in Fig. 8, may be used, this curtain being suspended by means of the hooks 53 at its upper corners from the carriage rod 11.

I claim as my invention:

1. In an indicator, the combination of a carriage; a series of indicator elements carried thereby; supporting means initially engaged with all of said elements; means for operating said supporting means for releasing said elements successively from engagement therewith; and a loader for reëngaging all of said elements at one time with said supporting means.

2. In an indicator, the combination of a carriage; a series of indicator elements carried thereby and provided with registering openings; a vertically-arranged supporting device initially inserted through the openings in all of said elements; means for operating said supporting device to release said elements successively; and a tubular loader adapted to be inserted through the openings in all of said elements after the same have been released, and to be subsequently fitted upon said supporting device, to permit the transfer of all of said elements simultaneously from said loader to said supporting device.

3. In an indicator, the combination of a carriage; a series of indicating elements carried thereby and provided with registering openings; a vertically-arranged spindle initially inserted through the openings in all of said elements and provided with a pivotally-mounted pin for supporting the same; means for operating said spindle to release said elements successively; and a tubular loader provided with a slotted upper end and adapted to be inserted through the openings in all of said elements after the latter have been released and to be subsequently fitted upon said spindle to permit the transfer of all of said elements simultaneously from said loader to said spindle, said pin being arranged for movement from operative to inoperative position prior to such transfer, and from inoperative to operative position subsequent to the same, and being adapted for reception in the slotted end of said loader when in operative position.

4. In an indicator, the combination of a pivotally-mounted carriage; a series of indicator elements carried thereby at one end; a vertically-arranged supporting device initially engaged with all of said elements at the opposite end thereof; means for operating said supporting device to release said elements successively, said carriage being arranged to turn gradually upon its pivot under the weight of the released elements, during the successive releasing operations, to maintain said released elements in vertical position; and a loader for raising said carriage and all of said elements into horizontal position and for reëngaging the latter with said supporting device.

In testimony whereof I have hereunto set my hand in presence of two subscribing witnesses.

AUGUSTUS MAY.

Witnesses:
LAWRENCE L. MAY,
JNO. J. WARD.

---

Copies of this patent may be obtained for five cents each, by addressing the "Commissioner of Patents, Washington, D. C."